United States Patent [19]
Ogino

[11] Patent Number: 6,064,452
[45] Date of Patent: May 16, 2000

[54] SINGLE PLATE COLOR LIQUID CRYSTAL DISPLAY APPARATUS

[75] Inventor: Masanori Ogino, Yokohama, Japan

[73] Assignee: Hitachi, Ltd., Tokyo, Japan

[21] Appl. No.: 09/120,324

[22] Filed: Jul. 22, 1998

Related U.S. Application Data

[63] Continuation of application No. 08/838,831, Apr. 10, 1997, Pat. No. 5,801,795.

[30] Foreign Application Priority Data

Apr. 17, 1996 [JP] Japan .................................. 8-095036

[51] Int. Cl.[7] .................................................. G02F 1/1335
[52] U.S. Cl. .............................................. 349/57; 349/61
[58] Field of Search .............................. 349/5, 57, 61, 349/62, 95, 110, 159; 359/569, 570, 571, 574, 619; 353/31, 32, 33, 122; 385/901

[56] References Cited

U.S. PATENT DOCUMENTS

| | | | |
|---|---|---|---|
| 4,686,519 | 8/1987 | Yoshida et al. | 349/95 |
| 4,798,448 | 1/1989 | Van Raatle | 349/95 |
| 5,264,880 | 11/1993 | Sprague et al. | 353/31 |
| 5,353,133 | 10/1994 | Bernkopf | 349/95 |
| 5,355,189 | 10/1994 | Kobayashi | 354/149.1 |
| 5,467,206 | 11/1995 | Loijeaux et al. | 349/5 |
| 5,506,701 | 4/1996 | Ichikawa | 359/15 |
| 5,537,171 | 7/1996 | Ogino et al. | 353/122 |
| 5,615,024 | 3/1997 | May et al. | 349/95 |
| 5,623,348 | 4/1997 | Ogino | 349/95 |
| 5,682,265 | 10/1997 | Farn et al. | 359/569 |
| 5,781,257 | 7/1998 | Gal et al. | 349/57 |

FOREIGN PATENT DOCUMENTS 6-230384  8/1994  Japan.

OTHER PUBLICATIONS

"Holographic Optical Element for Liquid Crystal Projector", N. Ichikawa, Asia Display 95, p. 729. No Date.
"Compact Spatio–Chromatic Single LCD Projection Architecture", Loijeaux et al, Asia Display 95, pp. 87–89. No Date.

*Primary Examiner*—William L. Sikes
*Assistant Examiner*—Tai V. Duong
*Attorney, Agent, or Firm*—Antonelli, Terry, Stout & Kraus, LLP

[57] ABSTRACT

White light is input to light diffracting means so composed as to have a structure including macro prisms combined with a lenticular structure and include diffraction gratings at a microscopic level. As the height (h(x)) of unit steps of said diffraction grating is modulated at every period of arranged pixels, the output diffracted light is decomposed into three primary colors, and guided with highly accurate matching to the three respective primary color pixels of a liquid crystal panel means. In the pitch modulation type diffraction grating of the prior art, it was basically impossible to avoid the defect that the converged positions of a red light ray and a blue light ray deviate about 30%. In contrast, according to the arrangement of this invention, it becomes possible to eliminate the deviation of the converged positions of not only the green light ray but the red light ray and the blue light ray, making it possible to provide a single plate type color liquid crystal display apparatus with high light utilization efficiency.

18 Claims, 14 Drawing Sheets

FIG. 1

COMPARISON OF THE PRESENT INVENTION WITH PRIOR ART

| | THIS INVENTION | | Ⓐ USP 5,355,189 USP 5,537,171 | Ⓑ JP-A-6-230384 | Ⓒ B.A.Loiseaux et al Asia Display '95. P87-89 | Ⓓ N.Ichikawa Asia Display '95. P727-729 | Note |
| --- | --- | --- | --- | --- | --- | --- | --- |
| | TYPE (I) | TYPE (II) | | | | | |
| 1. OBJECT  IMPROVE LIGHT UTILIZATION IN A SINGLE PLATE COLOR LIQUID CRYSTAL DISPLAY. | O | O | O | O | O | O | O (YES) |
| 2. MEANS | | | | | | | |
| 2.1 DIFFRACTING PLATE MEANS FLAT AT MACRO LEVEL WITH DIFFRACTION GRATING AT MICRO LEVEL | X | X | O | O | O | O | X (NON) |
| 2.2 LIGHT DIFFRACTING MEANS IN 3-D UNFLAT PLATE AT MACRO LEVEL WITH DIFFRACTION GRATING AT MICRO LEVEL | O | O | X | X | X | X | △ INSUFFICIENT |
| 2.3 LIGHT DIFFRACTING MEANS IN PRISM SHAPE AT MACRO LEVEL WITH DIFFRACTION GRATING AT MICRO LEVEL | O | — | X | X | X | X | — |
| 2.4 LIGHT DIFFRACTING MEANS LENTICULAR AT MACRO LEVEL WITH DIFFRACTION GRATING AT MICRO LEVEL | — | O | X | X | X | X | |
| 3. FUNCTION | | | | | | | |
| 3.1 DIFFRACTION GRATING ORIENTS THREE PRIMARY COLORS TO THREE DIRECTIONS. | O | O | O | O | O | O | |
| 3.2 DEFLECTING ANGLE OF G RAY BY DIFFRACTING MEANS: 10 MAX. (COMPACTNESS) | O | — | X | X | X | X | |
| 3.3 CONVERGENCE OF G RAY BY DIFFRACTING MEANS. | X | O | X | O | X | O | |
| 3.4 CONVERGENCE OF R, G AND B RAYS BY DIFFRACTING MEANS TO RESPECTIVE PIXELS HAS BEEN MADE COMPATIBLE | X | O | X | △ | X | △ | |

SINGLE PLATE COLOR LIQUID CRYSTAL DISPLAY APPARATUS

CROSS REFERENCE TO RELATED APPLICATION

This is a continuation of U.S. application Ser. No. 08/838,831, filed Apr. 10, 1997, now U.S. Pat. No. 5,801,795, the subject matter of which is incorporated by reference herein.

BACKGROUND OF THE INVENTION

The present invention relates to a single plate type color liquid crystal display apparatus featuring high efficiency achieved by utilizing light diffraction, and other products in which this invention is applied, and more particularly to a projection type display apparatus.

To help the present invention better understood, FIG. 1 summarizes the differences of the present invention from the prior art. In FIG. 1, document (A) is the present inventor's prior application titled "High Efficiency Liquid Crystal Display" U.S. Pat. No. 5,355,189 and U.S. Pat. No. 5,537,171, document (B) concerns "a display apparatus" (JP-A-6-230384), document (C) is a thesis titled "Compact Spatio-Chromatic Single-LCD Projection Architecture" by B. A. Loiseaux. et al, Asia Display. '95, P87–P89, and document (D) is another thesis titled "Holographic Optical Element for Liquid Crystal Projector" by N. Ichikawa, Asia Display. '95, P727–P729.

These techniques of the prior art, as indicated in Item 2.1 in FIG. 1, use diffracting plate means which have a flat plate as viewed at a macroscopic level and also includes diffracting plate means minutely formed at a microscopic level. FIG. 2 shows the function of the above-mentioned macroscopically flat diffracting plate means.

In FIG. 2, reference numeral 1 denotes single plate type color liquid crystal panel means, 2 denotes three-primary-color pixels, 3 denotes light-input-side lenses forming three-position means for converging input three rays of each primary color coming from three directions to respective color positions at every triopixel pitch, 23 denotes a block collectively representing a light source and collimator means. For the functions of the above-mentioned components, refer to the descriptions in technique (A) in prior art in FIG. 1. Reference numeral 5 denotes macroscopically flat diffracting plate means, 6 denotes a diffraction grating formed on the outgoing plane of the diffracting plate means 5, 7 denotes incident white light, and 7' denotes the direction of a zero-order light output from the diffracting plate. Normally, such a structure of the diffraction grating is selected as to minimize the power of the zero-order light. R, G and B represent red, green and blue light rays, but they may sometimes be referred to as R ray and so on for short. Reference numerals 8, 8' and 8" denote G ray, R ray and B ray of the first-order diffracted light output from the diffracting plate. The angle $\omega$ denotes the angle of deflection of G ray by the diffracting plate, and denotes a difference between the angle of deflection of R ray and that of G ray caused by the diffracting plate and is hereafter referred to as "R-G separation angle."

Next, with regard to Item 3.2 in FIG. 1, the reason why the deflection angle of G ray has to be 20 or larger in the prior art will be described with reference to FIG. 3.

In FIG. 3, reference numerals 6, 7 and 8 and 8 and $\omega$ denote the same things as have been described. The symbol $\alpha 1$ denotes the angle of incidence of the incident light to the diffraction grating 6, $\epsilon_1$ denotes the angle of divergence of the incident light, $\alpha_2$ and $\epsilon_2$ denote the incident and diverging angles of the first-order diffracted green outgoing light, $\alpha'_2$ denotes the incident angle of the red outgoing light, and $P_0$ denotes the pitch (period of array) of the diffraction grating.

In compliance with the principle of light diffraction, the following equation holds.

$$\frac{\lambda_G}{P_0} = \sin\alpha_1 + \sin\alpha_2 \approx \alpha_1 + \alpha_2 = \delta_G \quad (1)$$

$$\frac{\lambda_R}{P_0} = \sin\alpha_1 + \sin\alpha'_2 \approx \alpha_1 + \alpha_2 \quad (2)$$

where $\lambda_G \approx 530$ nm (G ray wavelength)
$\lambda_R \approx 610$ nm (R ray wavelength)

$$\omega \equiv \alpha'_2 - \alpha_2 \approx \frac{\lambda_R - \lambda_G}{P_0} \frac{1}{\cos\alpha_2} \quad (3)$$

$$\approx \frac{\lambda_R - \lambda_G}{P_0} \approx \frac{80 \text{ nm}}{P_0}$$

$$\frac{\omega}{\delta_G} \approx \frac{\lambda_R - \lambda_G}{\lambda_G} \approx \frac{80 \text{ nm}}{530 \text{ nm}} \approx 0.15 \quad (4)$$

That is to say, it is known that the magnitude of the G-R separation angle $\omega$ is subordinately constrained by the green deflection angle $\delta_G$, and limited to about 15% of $\delta_G$.

On the other hand, attention needs to be paid to a fact that the relation between the diverging angles $\epsilon_1$ and $\epsilon_2$ can be obtained by differentiating equation (1).

$$\Delta\sin\alpha_1 + \Delta\sin\alpha_2 = 0 \quad (5)$$

$$\therefore \cos\alpha_1 \Delta\alpha_1 + \cos\alpha_2 \Delta\alpha_2 = 0$$

$$\therefore \frac{\epsilon_2}{\epsilon_1} \cong \left|\frac{\Delta\alpha_2}{\Delta\alpha_1}\right| \left|\frac{\cos\alpha_1}{\cos\alpha_2}\right| \quad (6)$$

$$\approx 1 \text{ for } \alpha_1, \alpha_2 \ll 1$$

To separate G ray and R ray, the following condition must be satisfied.

$$\omega > \omega_2 \quad (7)$$

$$\therefore \delta > \epsilon_1$$

$$\because (6)$$

Generally, according to the law of energy conservation, if the effective surface area of a Lambertian light source is designated by $A_0$ and the vertical projection of the incident area of the diffracting plate is designated by $A_1$, the diverging angle $\epsilon_1$ of the incident light is given by the following expression.

$$\epsilon_1 \approx 2\sqrt{\frac{A_0}{A_1}} \quad (8)$$

$$\therefore \epsilon_{1MAX} > 2\sqrt{\frac{A_0}{A_1}} \quad (9)$$

If the diverging angle distribution is uniform, equation (8) holds. In actuality, however, the diverging angle distribution is not uniform, so that inequality (9) holds. Normally, the maximum value $\epsilon_{1MAX}$ of $\epsilon_1$ is about 1.5 times as large as $\epsilon_1$ in most cases. The minimum projection light source proposed as a test case in the past is about 1.4 mm$\phi$ and therefore the surface area is $\pi$ (1.4 mm)$^2$, namely, about 6.3 (mm)$^2$. The surface area of the ordinary projection light source is about 25 (mm)$^2$. On the other hand, the area of the diffracting plate is substantially equal to the area of the liquid crystal panel, and the diffracting plate of the maximum size for projection use has an opposite angle of about 6.5" and an area of 13,000 (mm)2. By substituting those values into expression (9), we have the following expression.

$$\omega > \varepsilon_{1MAX} \approx 3\sqrt{\frac{A_0}{A_1}} \quad (10)$$
$$\approx 0.07 - 0.14 \text{ [rad]}$$

$$\therefore \delta_G \underset{(4)}{\approx} \frac{\omega}{0.15} > 0.44 - 0.9 \text{ [rad]} \quad (11)$$
$$(\equiv 25°-50°)$$
$$\text{If } \omega \approx 0.05 \text{ rad}, \delta \approx \frac{1}{3} \text{ rad} \gg 10°$$

As is obvious from the above expression, it is very difficult in the prior art to set the deflection angle $\delta_G$ to be 10° less when the R-G separation angle is 0.05 rad or larger.

From the above explanation, the description of the prior art in Item 3.2 in FIG. 1 can be understood.

The ground for the description of the prior art in Item 3.4 in FIG. 1 will be demonstrated in the following.

Before that, as the first step, it is necessary to describe the principle of prior art techniques (B) and (D) related to Item 3.3 in FIG. 1. Description will be made with reference to FIG. 4.

In FIG. 4, reference numerals 1 and 2 denote the same things as have been described, 11, 12 and 13 denote incident light rays, 11', 12' and 13' denote the outgoing directions of zero-order light rays, and 6' denotes a modulated pitch macroscopically flat diffraction grating. The symbol $\omega$ denotes the above-mentioned R-G separation angle, T denotes a pitch of trio pixel array, and $\delta_1$, $\delta_2$ and $\delta_3$ denote lower, middle and upper deflection angles of respective first-order diffraction G rays. As illustrated, the deflection angles are modulated differently at each pitch of trio pixel array. Therefore, in the conventional techniques (B) and (D) in FIG. 1, it is implicitly proposed to modulate the pitch of the diffraction grating according to the above-mentioned equation (1). Therefore, from the relation in FIG. 1 and equation (1), the relation of the following expression needs to be satisfied.

In the following expressions, $P_{01}$, $P_{02}$ and $P_{03}$ are the pitches of those portions of the diffraction grating which correspond to the $\delta_1$, $\delta_2$ and $\delta_3$.

$$\left.\begin{array}{l}\delta_3 = \delta_2 + 1.5\omega \\ \delta_1 = \delta_2 - 1.5\omega\end{array}\right\} \quad (12)$$

$$P_{02} \approx \frac{\lambda_G}{\lambda_2} \underset{(4)}{\approx} \frac{\lambda_G}{6.6\omega} \quad (13)$$

$$P_{01} \approx \frac{\lambda_G}{\delta_1} = \frac{\lambda_G}{\delta_2 - 1.5\omega} \approx \frac{\lambda_G}{5.1\omega}$$
$$\approx 1.3 P_{02}$$

$$P_{03} \approx \frac{\lambda_G}{\delta_3} = \frac{\lambda_G}{\delta_2 + 1.5\omega} \approx \frac{\lambda_G}{8.1\omega} \quad (14)$$
$$\approx 0.8 P_{02}$$

-continued $$\therefore \frac{P_{01}}{P_{03}} \approx 1.6 \quad (15)$$

By the above analysis, the following could be clarified. Specifically, if the pitch of the diffraction grating is modulated in synchronism with the period of trio pixel array to satisfy equations (13) and (14), the diffraction grating 6' can be made to also play the role of the three-position means 3 in FIG. 2 so long as G ray is concerned. With this, description of the result of clarification by the present inventor of the principles of the conventional techniques related to Item 3.3 in FIG. 1 is finished.

As the second step, description will proceed to the conventional technique in Item 3.3 in FIG. 1. In the macroscopically flat plate diffraction grating, there is a condition of constraint shown in equation (4), which has been described above. From equations (4), (1) and (15), it is inevitable that an unfavorable expression given below holds.

$$\frac{\omega_{01}}{\omega_{03}} \approx \frac{P_{01}}{P_{03}} \approx 1.6 \quad (16)$$

In the above equation, $\omega_{01}$ and $\omega_{03}$ are R-G separation angles by those portions of the diffraction grating which correspond to $\delta_1$ and $\delta_3$ in FIG. 4. The relation represented by the above expression is shown in FIG. 5.

If in the above expression the value is 1.0 instead of 1.6, all three rays, including the red ray and the blue ray, besides the green ray, are matched (coincide) with the liquid crystal elements. However, because the above value is 1.6, the red ray and the blue ray are not matched with the target liquid crystal elements as shown in FIG. 5. In other words, the utilization efficiency of the red and blue light ray deteriorates.

FIG. 5 shows only one period of the trio pixel array. In FIG. 5, reference numerals 2 and 6' denote same things as already described, 14, 15 and 16 denote the first order diffracted G rays, 17, 18 and 19 denote the first order diffracted R rays, and 20, 21 and 22 denote the first order B rays. As is clear from FIG. 5, R and B component rays of the principal ray striking the center of each pitch of the diffraction grating 6' are both correctly incident on the target pixels. On the other hand, the marginal rays corresponding to both end portions of each pitch are unable to be incident on the target pixels due to deviation loss. Therefore, in the techniques (B) and (D) in the prior art, the problem has become evident that the convergence of R and B rays to the red and blue pixels by the diffraction grating is not compatible as mentioned in Item 3.4 in FIG. 1. More specifically, the problem includes the deterioration of the transmission efficiency of R and B rays and the deterioration of chromatic purity owing to color mixture.

In the course of the above description, the constraint on the size of a usable light source was mentioned, and it is vitally important to take this constrain into consideration.

This is because not only a point light source such as can be expressed as a mathematical concept of a point does not exist in reality, but it should be understood that a point light source is incapable of existing according to the principle of uncertainty or the second law of thermodynamics. A premise including only one wrong hypothesis would lead to illusions such that innumerable impossibilities are taken for possibilities. For example, if a viability of a point light source is supposed, from this it may be deduced that thermonuclear power generation can be realized easily.

Therefore, the above-mentioned constraint on the size of the light source is an important matter requiring consideration.

The present invention could not have been possible without the above-mentioned result of clarification by the present inventor. On account of this, this subject will first be summarized in the following.

SUMMARY OF THE INVENTION

An object of the present invention is to provide a single plate type color liquid crystal display apparatus featuring the improved transmission efficiency.

Another object of the present invention is to provide a liquid crystal display capable of having the deflection angle $\delta_G$ by the light diffracting means of 10 (0.17 rad) or less and the R-G separation angle $\omega$ of 3° (0.05 rad) or larger (in other words, thus overcoming the constraint by equation (4)).

A further object of the present invention is to provide a novel optical system capable of make compatible the convergence by the light diffracting means of rays to the target R, G and B pixels (thus overcoming the constraint in equation (16)).

Yet another object of the present invention is to provide a new-fangled optical system for reducing nearly in half a substantial increase of the light diverging angle caused by the R-G separation angle by the light diffracting means.

A still further object of the present invention is to provide a liquid crystal display apparatus for improved picture quality.

An additional object of the present invention is to provide a liquid crystal display apparatus of less power consumption type by improving the light utilization efficiency.

Another object of the present invention is to provide a compact space-saving or light-weight liquid crystal display apparatus.

In order to achieve the above objects, in preferred embodiments of the present invention, both types [1] and [2] in FIG. 1 of the liquid crystal display include common novel light diffracting means, and the novel light diffracting means is, at its macroscopic level, a three-dimensional unflat plate form with a macro structural periodicity having at least either macro prisms or a macro lenticular face, together with multi-stepped diffraction gratings at its microscopic level.

In an embodiment of the present invention formed to achieve the above object, the display apparatus is in a shape having prisms at its macroscopic level, and also includes light diffracting means having a diffraction grating formed on an oblique side face of each prism at its microscopic level.

The light diffracting means serves to cancel its angle of deflection by its macro prisms. Therefore, the R-G separation angle can be set at 3° or larger, and the deflection angle of G ray can be set at 20° or less. The reduction of the deflection angle is effective in reducing the volume of the cabinet for housing the optical system.

In another embodiment of the present invention, the light diffracting means is formed with a macro lenticular face, and the pitch of array of the lenticular elements is selected so as to be equal to the pitch of trio pixel array of the liquid crystal panel. The lenticular structure enables the G rays emerging from the diffraction grating to converge to the G pixels. The pitch of the diffraction grating array is set to obtain an adequate G-R separation angle $\omega$ independently of the modulated pitch of the diffraction direction of G rays.

Therefore, by overcoming the condition of constraint in the above-mentioned equation (16), it becomes possible to make compatible the convergence of R, G and B rays to the target pixels by the light diffracting means. Thus, the light transmission efficiency and the chromatic purity can be improved, and therefore, and therefore the picture quality can be enhanced.

In a further embodiment of the present invention, collimator means for reducing the light diverging angle is installed at the rear of the diffraction grating. The focal plane of the collimator means is selected so as to substantially coincide with the diffraction grating (accuracy within about ±30%). Therefore, the rays incident on the same point of the diffraction grating emerge as parallel rays from the collimator means. Consequently, the light diverging angle can be decreased. In an application that projection lens means is placed at the rear of the liquid crystal panel means, this method is effective in reducing the aperture and the weight of the projection lens means. Generally, the liquid crystal panel can reproduce high quality images with high contrast ratio the better at smaller diverging angles of the rays passing therethrough. Accordingly, the picture quality can be improved by the function of the collimator means for reducing the light diverging angle.

BRIEF DESCRIPTION OF THE DRAWINGS

FIG. 1 is a table comparing the differences in object, means, and effects between the present invention and the prior art;

DETAILED DESCRIPTION OF THE PREFERRED EMBODIMENTS

Figure 6:
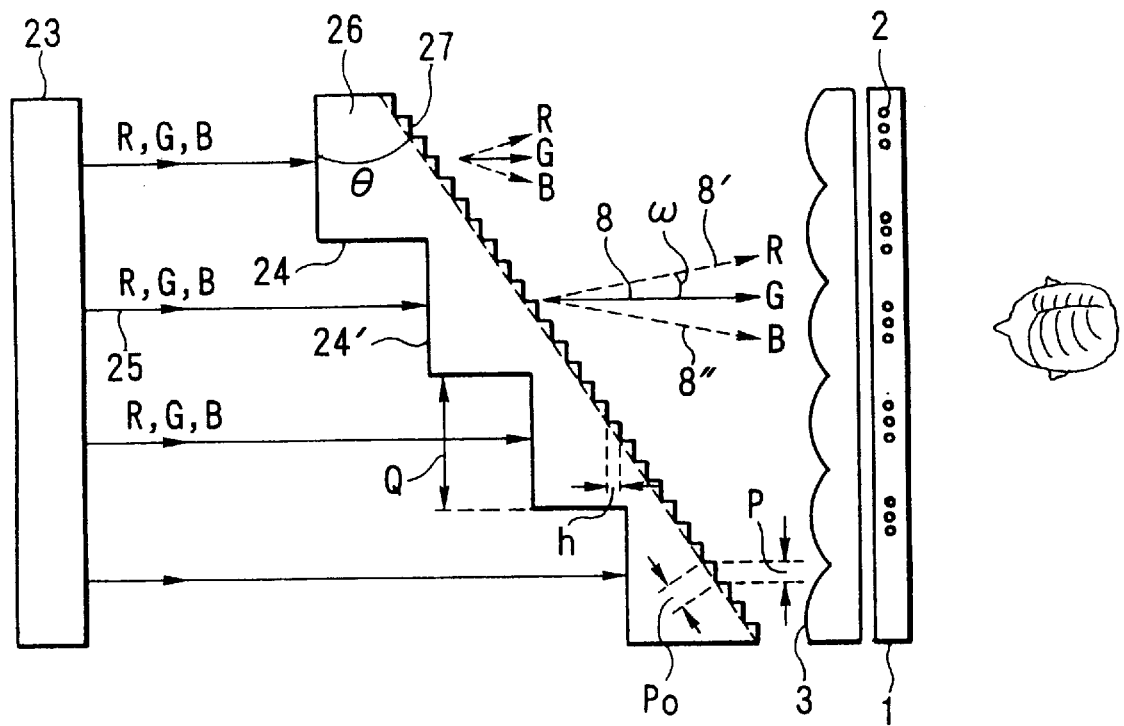
FIG. 6 is a schematic structure diagram showing a first embodiment (Type I) including macro prism diffracting means according to the present invention.

FIG. 6 shows a first embodiment of the present invention.

In FIG. 6, reference numeral 1 denotes the single plate type color liquid crystal panel means already mentioned, 3 denotes the three-position means already mentioned, 23 denotes the block including a light source and collimator means already mentioned, denotes a white ray, 26 denotes macro prism type diffracting means including at a macroscopic level prisms and at a microscopic level a diffraction grating formed on the oblique side face of each prism. Reference numeral 27 denotes a diffraction grating, $\theta$ denotes the vertical angle of the macro prism, $P_0$ denotes the pitch of the diffraction grating array, P denotes the projection of $P_0$ as viewed from the emerging direction of the first order diffracted ray, that is, the projection of the pitch which is measured at right angles with the traveling direction of the light, and which is substantially equal to $P_0 \cos \theta$. The h denotes the height of a unit step as a component part of the diffraction grating, 24 and 24' denotes the side faces of the row of prisms, the respective side faces 24 and 24' being so arranged as to be substantially parallel with or at right angles with the incident white light 25. The Q denotes the arraignment pitch of the row of macro prisms as viewed from the direction of the incident light, in other words, the projection of the pitch in the direction at right angles with the light traveling direction. The 8, 8' and 8" denotes G, R and B rays of the first order diffracted output rays, and $\omega$ denotes the R-G separation angle. The operation principle of this embodiment will be described using the following expressions.

$$(n-1)h = \lambda_0 \quad (17)$$

$$P \approx \frac{\lambda_R - \lambda_G}{\omega} \approx \frac{80 \text{ nm}}{\omega} \quad (18)$$

$$Q > 100\lambda_G \approx 53 \ \mu m \quad (19)$$

$$\frac{|\lambda_0 - \lambda_G|}{P} < \frac{10°}{57.3°} \approx 0.17 \quad (20)$$

-continued $$\therefore |\lambda_0 - \lambda_G| < 0.17P = 0.17 \frac{80 \text{ nm}}{\omega} \quad (21)$$

$$\approx \frac{13 \text{ nm}}{\omega}$$

$$\therefore \text{If } \omega \approx 0.05 \text{ rad}, \quad (22)$$

$$|\lambda_0 - \lambda^G| < 260 \text{ nm}$$

In equation (17), $\lambda_0$ denotes the characteristic wavelength of this system, n denotes the refractive index of the medium forming the macro prism type light diffracting means. The first order diffracted ray of wavelength $\lambda_0$ passes at zero deflected angle through the light diffracting means. This is because the effective optical path difference at each unit step of the diffraction grating is a difference of (n−1)h between nh in the medium and h in the air and the difference is equal to wavelength $\lambda_0$ according to equation (17). FIG. 6 exemplifies a case where $\lambda_0$ is equated with $\lambda_G$. The $\lambda_R$, $\lambda_B$ or any specific wavelength of the infrared or ultraviolet region can be selected for the $\lambda_0$ in a range that the selected wavelength satisfies equation (21).

Equation (18) expresses the relation between the R-B separation angle $\omega$ and the projected pitch P of diffraction grating. To realize the R-G separation angle 3° or larger ($\omega$ of 0.05 rad or more), which is aimed at in the present invention, it is required to set the projected pitch P at 1.6 $\mu$m or less according to equation (18).

Inequality (19) is the condition for limiting the diffraction by the macro prism to less than 0.01 rad. By satisfying this condition, the light diverging angle can be prevented from increasing, so that a liquid crystal display with reduced color mixture between R, G and B and superior picture quality can be realized.

Inequalities (20) and (21) are the conditions for limiting the deflected angle of G ray to less than 10°. Inequality (22) shows the condition for limiting the deflected angle of G ray to less than 10° when the R-B separation angle is 0.05 rad or less, which is aimed at in this embodiment. The conditions in this embodiment are arranged for generalizing purposes as follows.

(1) The effective optical path difference (n−1)h at each unit step of the diffraction grating is equal to an integer multiple of a specific wave $L\lambda_0$. . . . Equation (17)

(2) The projected array pitch P is equal to 80L nm/$\omega$. . . . Equation (18)

(3) The projected pitch P of the macro prism is 100 times the green wavelength $\lambda_G$, that is, larger than 53 $\mu$m . . . . Inequality (19)

(4) The difference between a specific wavelength $\lambda_0$ and the green wavelength $\lambda_G$ is smaller than 260 nm. . . . Inequality (22)

In (1) and (2) listed above, the L is a positive integer of 1 or more or 3 or less. In the above description, the value of L was 1. However, the L value of 4 or larger is not recommended. The reason is that if the L value is 4 or larger, the diffraction efficiency declines intolerably, though detailed description is omitted here. If the value of L is 1, 2 or 3, these values may be used in this embodiment. In such a case, the L-th order diffracted light is used.

With the above, description of the first embodiment of the present invention is finished.

Figure 7:
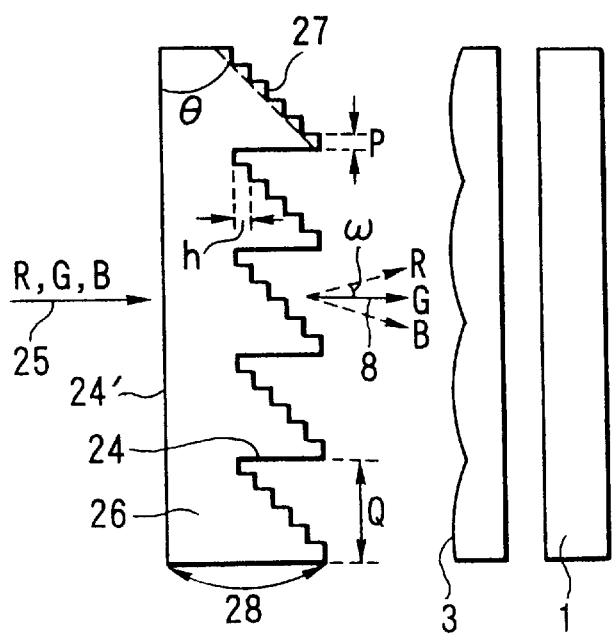
FIG. 7 is a schematic structure diagram showing a second embodiment (Type I) including macro prism diffracting means according to the present invention.

A second embodiment of the present invention is shown in FIG. 7.

In FIG. 71 reference numerals 1, 3, 8, 24, 24', 25, 26 and 27 designate the same things as those mentioned above.

In FIG. 6, the macro prism type light diffracting means 26 has a macro prism provided on the light input side thereof and a diffraction grating 27 formed on the light output side thereof, whereas in FIG. 7, both the macro prism and the diffraction grating 27 are provided on the light output side of the macro prism type diffraction grating means 26. The macro prism type light diffracting means 26 and the diffraction grating 27 may be manufactured separately and joined together later.

Therefore, expressions (17) to (22) are applied also to this second embodiment. With this, description of FIG. 7 is finished. The above two embodiments correspond to Type I of the present invention. Let us move on to description of Type II.

Figure 8:
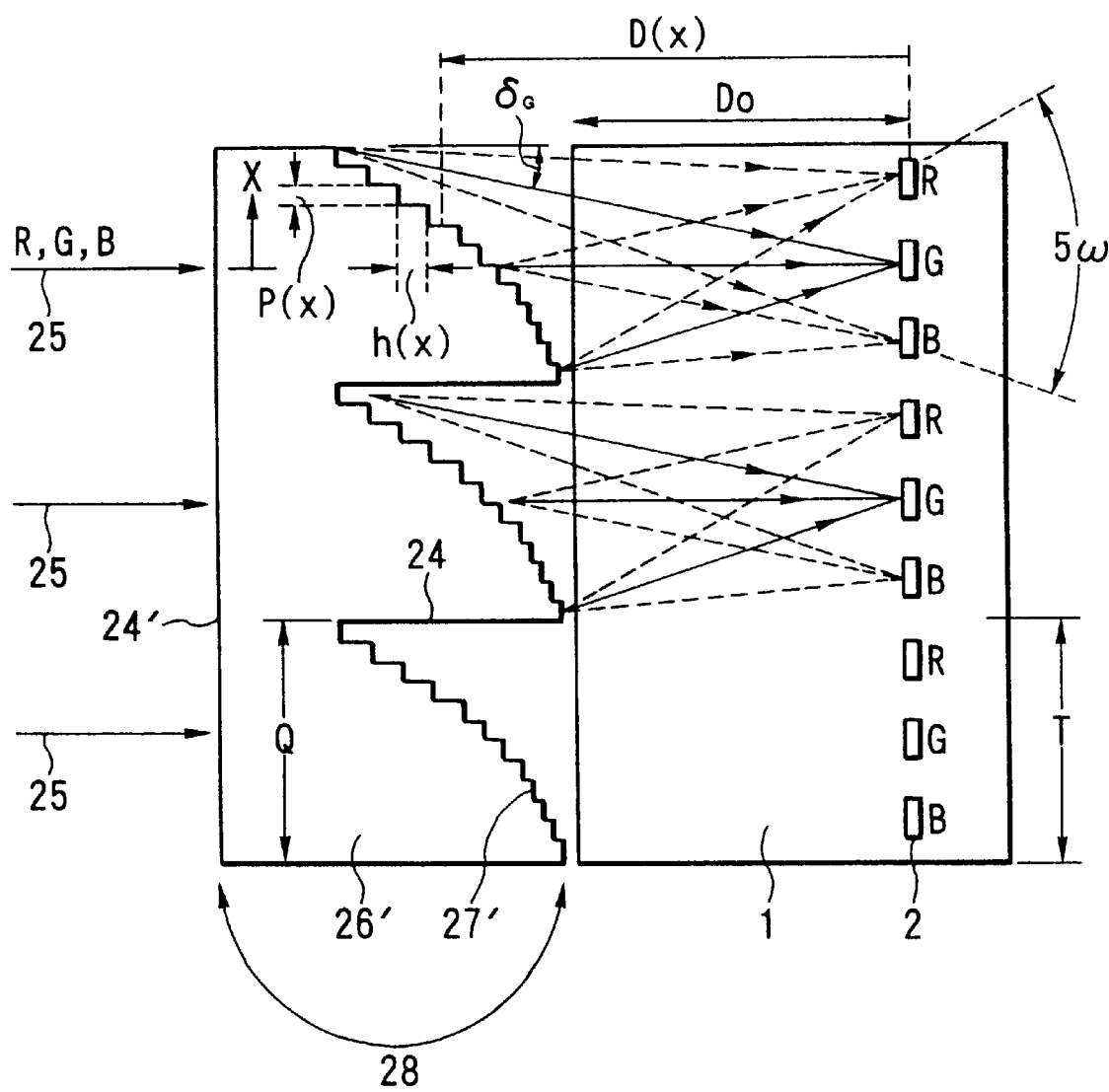
FIG. 8 is a schematic structure diagram showing a third embodiment (Type II) including macro prisms combined with macro prism type diffracting means according to the present invention.

FIG. 8 shows a third embodiment of the present invention. In FIG. 8, reference numerals 1, 2, 24, 24', and 25 designate the same things as those described above. Reference numeral 26' denotes macro lenticular light diffracting means, and 27' denotes diffraction gratings. In the third embodiment, the arrangement pitch Q of macro lenticular elements is set to be equal to the pitch of trio pixel array of the liquid crystal panel means 1. The third embodiment differs from the second embodiment in FIG. 7 in that the oblique side faces of the row of macro prisms are curved in a lenticular structure. Therefore, the height h of the unit steps of the diffraction grating is not uniform, so that the height h is modulated periodically.

Figure 2:
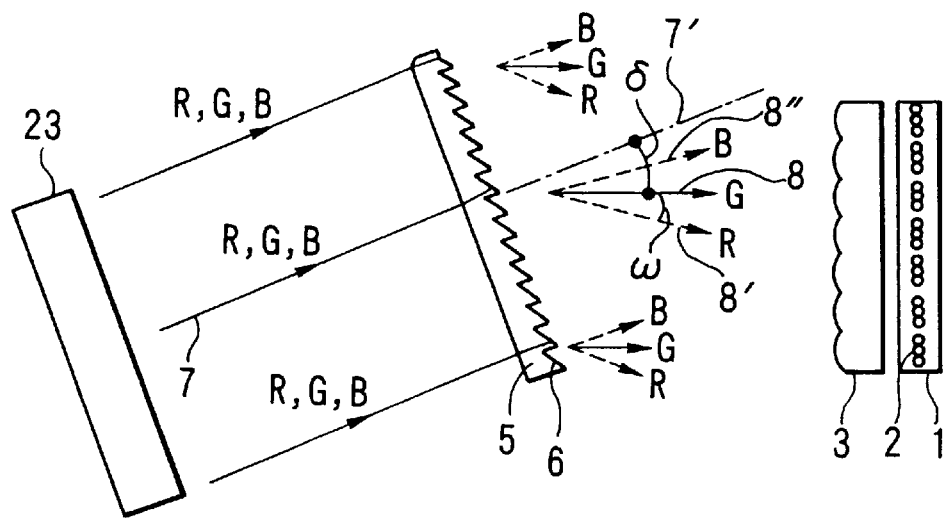
FIG. 2 is a schematic structure diagram showing the basic structure of the liquid crystal display apparatus in the prior art.
Figure 3:
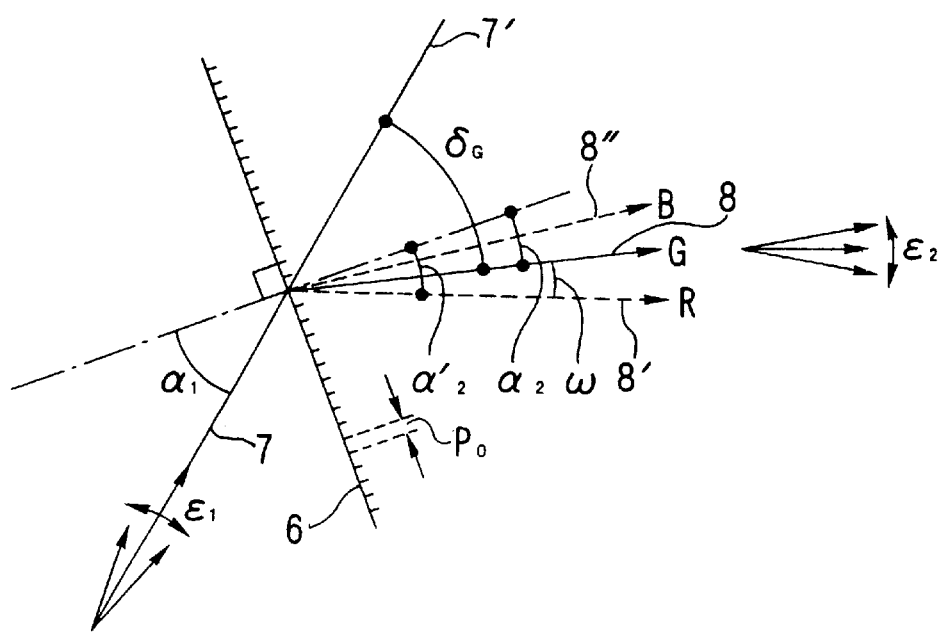
FIG. 3 is a light ray diagram showing the function of the macroscopically flat diffracting plate in FIG. 2.
Figure 4:
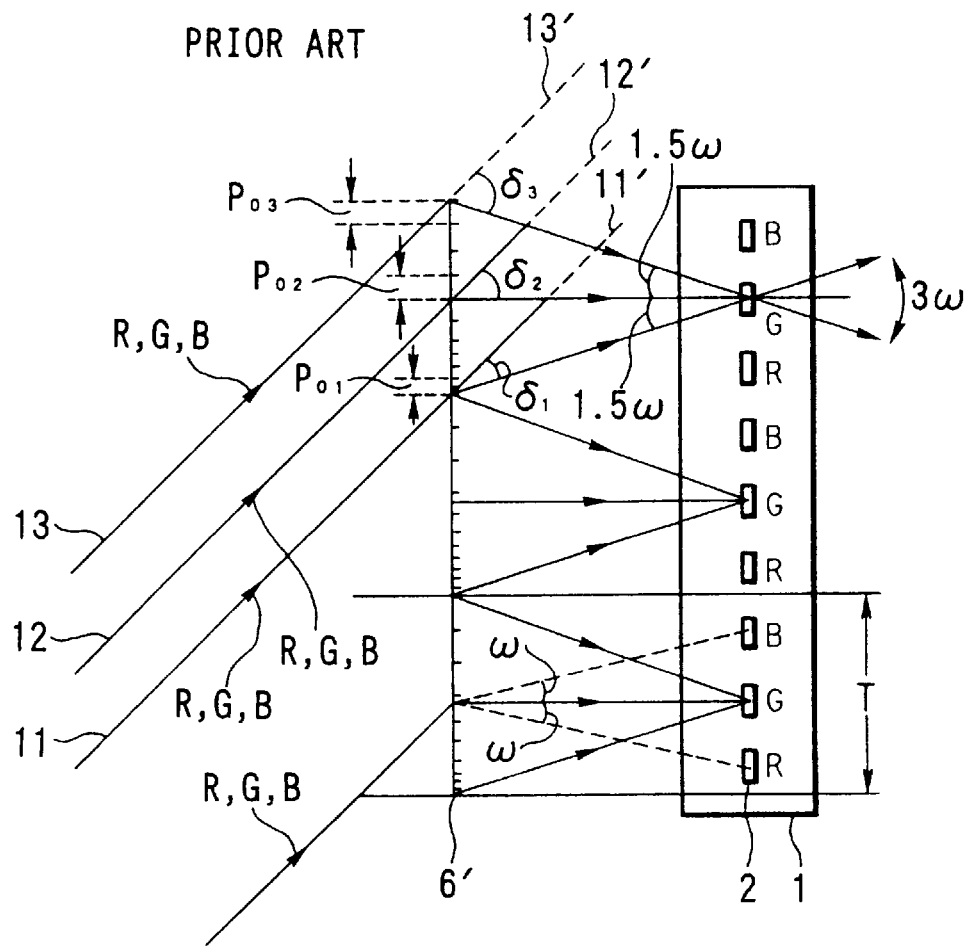
FIG. 4 is a schematic light ray diagram showing the operation principle of the prior-art modulated pitch type macroscopically flat diffracting plate.
Figure 5:
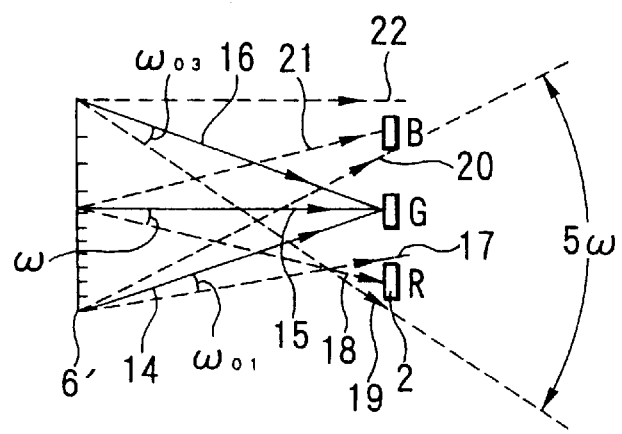
FIG. 5 is a schematic light ray diagram for explaining the problem of the prior-art modulated pitch type macroscopically flat diffracting plate.

In the prior art shown in FIGS. 4 and 5, the array pitch $P_0$ of the diffraction grating is modulated, whereas in the third embodiment the height h(x) of the diffraction grating is modulated periodically. By taking coordinates x in the direction as shown in FIG. 8, and designating the distance between the row of pixels 2 and the diffraction grating by D(x), the condition for composing the third embodiment is expressed by the following equation. Since h(x) and D(x) are periodic functions with a period T, the condition is expressed only for the uppermost one period.

$$(n-1)h_{(x)} = L\lambda_G + \frac{xP_{(x)}}{\frac{D_0}{n} + D_{(x)} - D_0} \quad (23)$$

$$\delta_G = x \bigg/ \left( \frac{D_0}{n} + D_{(x)} - D_0 \right) \quad (24)$$

$$P_{(x)} = \frac{L(\lambda_R - \lambda_G)}{\omega} \frac{\left( \frac{D_0}{n} + D_{(x)} - D_0 \right) L}{T/3} \quad (25)$$

$x$ 80 nm $$\therefore \omega \approx T/3 \left( \frac{D_0}{n} + D_{(x)} - D_0 \right) \quad (26)$$

$$Q > 53 \ \mu m \quad (19)$$

In the above equations, L denotes integers of 1 to 3, n denotes the refractive index of the medium of the liquid crystal panel means and the light diffracting means, and $D_0$ denotes the distance from the surface of the liquid crystal panel means to the row of pixels. The symbol T denotes the trio pixel period, P(x) denotes the projected pitch (the pitch measured in the direction at right angles with the light traveling direction), $\lambda_R$ and $\lambda_G$ denote wavelengths of R and G rays, and $\delta_G$ denotes the deflected angle of G ray.

Equation (23) shows the condition for setting the effective optical path difference (n−1)h(x) of each step of the grating for G ray so that the L-th order diffracted G ray travels in the direction of the G pixel. The denominator, $D_0/n+D(x)−D_0$, of the last term of equation (23) is the effective optical path length from the diffraction grating to the pixel row of the liquid crystal panel, and the numerator x is the distance in the x direction measured from the center of the G pixel. The ratio between them is equal to the deflected angle $\delta_G$ of G ray. (Equation (24))

Equation (25) shows the condition for making the R-G separation angle equal to i. Inequality (19) has already been described.

Reference numeral 28 indicates that face 24' and face 27' may be reversed. This holds for FIG. 7. As is clear from the above description, according to this third embodiment, the defects in Item 3.4 in the prior art can be overcome.

Nevertheless, the diverging angle of output from the liquid crystal panel in the third embodiment has a large value of 5 ω as shown in FIG. 8. This vale is equal to the output diverging angle of 5 ω in the prior art in FIG. 5 and corresponds to the total value of ±ω and ±1.5 ω in FIG. 4. A fourth embodiment for decreasing the output diverging angle to about 3 ω is shown in FIG. 9.

Figure 9:
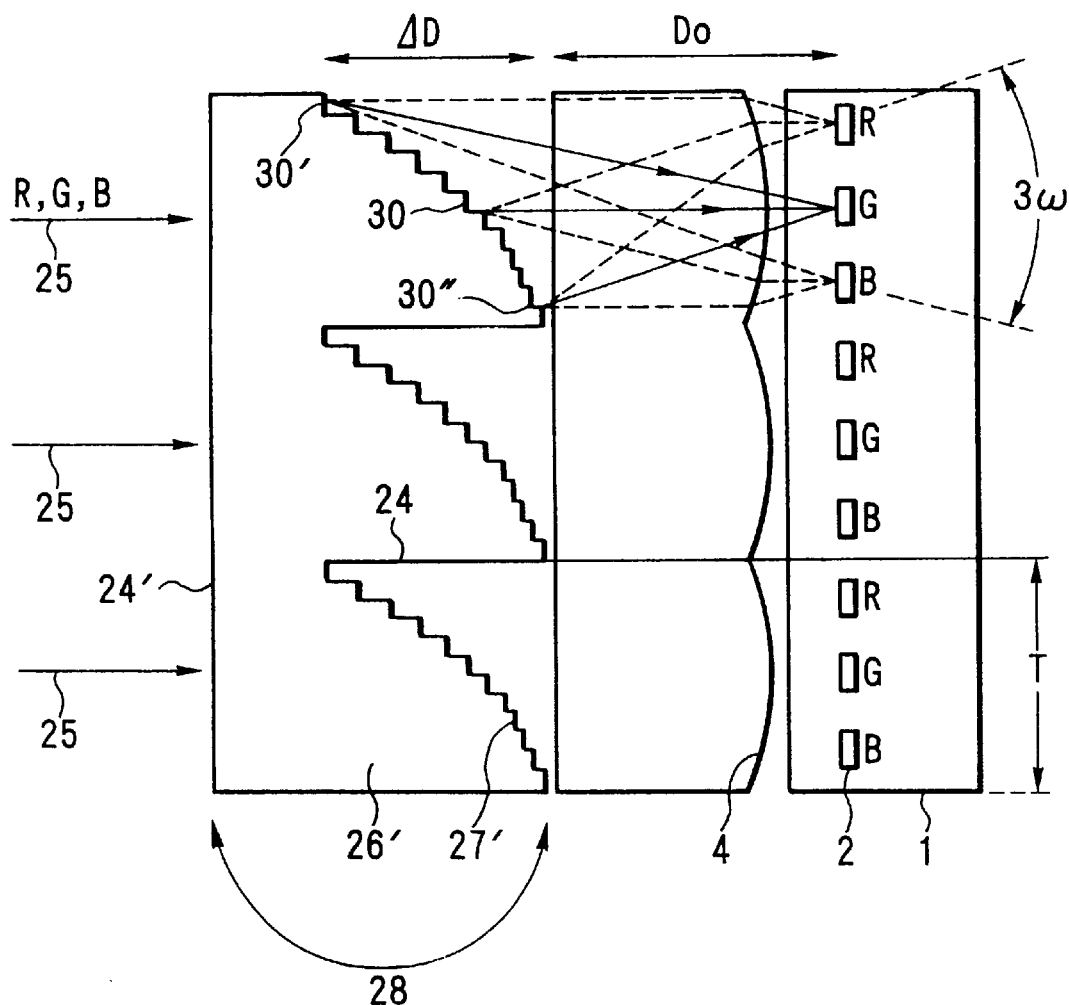
FIG. 9 is a schematic structure diagram showing a fourth embodiment (Type II) including macro prisms combined with macro prism type diffracting means according to the present invention.

In FIG. 9, reference numerals other than 4 designate the same things as shown in FIG. 8., 4 denoting lenticular lenses forming the divergence-reducing collimator means. The focal plane of the collimator means is selected so as to substantially coincide with the diffraction grating face 27' (accuracy within ±30%). For clarity of illustration, the height ΔD of the macro prism is expressed so to be about the same as the distance to the pixel face, $D_0$, but in actuality $\Delta_D$ is less than about ⅕ of $D_0$. Therefore, the above setting is possible. By the work of the collimator means 4, the light rays emerging from the same point of the diffraction grating face 27', regardless of their direction, become parallel rays when they are output from the collimator means. Therefore, the ray emerging from each center 30 of the macro prism face, namely, the principal ray is converted into parallel rays perpendicular to the liquid crystal panel face. The marginal rays 30' and 30" are converted respectively into parallel rays at angles of ±1.5 ω to the normal of the liquid crystal panel. Consequently, the diverging angle of output rays from the panel is reduced to about 3 ω (reduced to about a half of 5 ω With this, description of FIG. 9 is finished. A fifth embodiment by which to further reduce the diverging angle is shown in FIG. 10.

Figure 10:
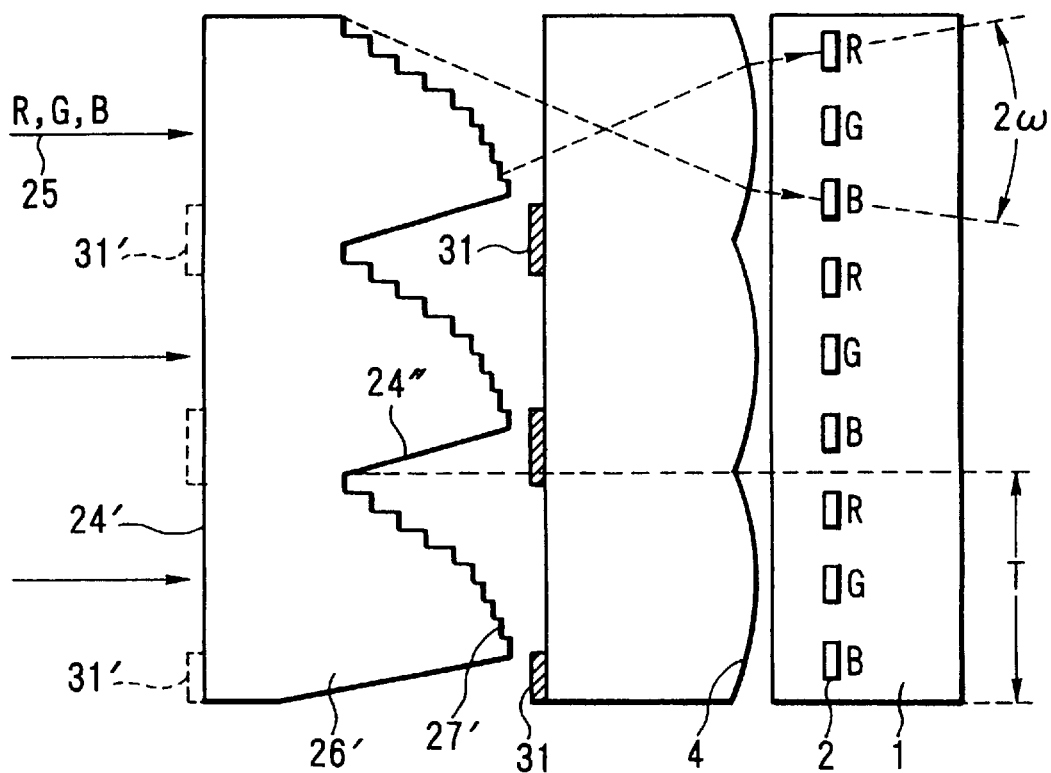
FIG. 10 is a schematic structure diagram showing a fifth embodiment (Type II) including macro prisms combined with macro prism type diffracting means according to the present invention.

In FIG. 10, 31 denotes black stripe means, which are formed right behind the light output face of or on the light input face 24' of the light diffracting means 26' as indicated by 31". Faces 24" are located along the light traveling direction and may be formed inclined as illustrated. (In some cases, the faces 24" thus inclined facilitate the manufacture of the light diffracting means 26'.) The parts other than mentioned in this paragraph are the same as those shown in FIG. 9.

If the width of the black stripes is set to be about ⅔ of the trio pixel period T, the diverging angle of the emerging rays from the liquid crystal panel can be reduced to ⅔ that of the case where no black stripes are used, more specifically, reduced to about 2 ω as shown in FIG. 10.

According to the fifth embodiment, the light transmission efficiency is reduced in proportion to the black stripe rate, but the diverging angle of the output light can be decreased, and owing to the color mixture prevention and the improved contrast ratio, the picture quality improves. Note that the fifth embodiment comprises single plate type color liquid crystal panel means, three-direction means, three-position means, and black stripe row means, in other words, the diffraction grating is not a requirement. With this, description of FIG. 10 is finished. The above-described embodiments are of a type using the pixel array of a trio of RGB, RGB, and so on. Description will now be made of an applied example using a quad type pixel array of RGBG, RGBG and so on.

Figure 11:
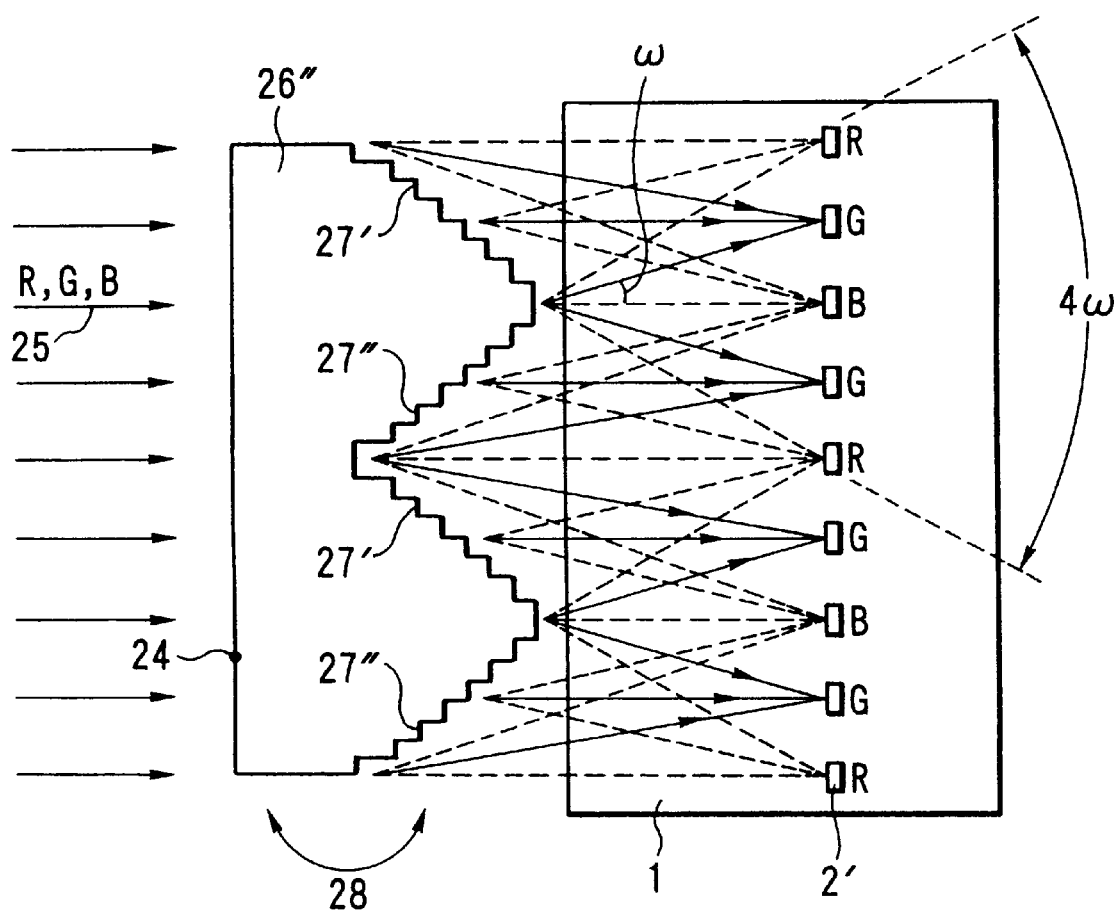
FIG. 11 is a schematic structure diagram showing a sixth embodiment (Type II) including macro prisms combined with macro prism type diffracting means according to the present invention.

FIG. 11 shows a quad type applied example as a sixth embodiment of the present invention. In FIG. 11, reference numeral 27" denotes diffraction gratings formed on oblique side faces of the macro prisms, which are inclined in the reverse direction to the gratings 27' already described, and 2' denotes a row of quad-arranged pixels. As is obvious from the arrow marks of the light rays, according to this sixth embodiment, the color rays can be collected to the quad-arranged pixels.

As is well known, the brightness contribution rates of the R, G and B component rays forming a white ray are roughly 30%, 60% and 10%. Therefore, there is an advantage that the quad pixel array enables high-resolution images to be realized with a smaller total number of pixels. It ought to be noted that the output diverging angle in the sixth embodiment is about 4 ω. Modifications shown in FIGS. 9 and 10, which were made to FIG. 8, can also be applied to FIG. 11, and similar modifications are included in the present invention.

In each of the above embodiments, the micro-level faces of the diffraction grating of each prism respectively include the faces substantially parallel with and the faces substantially at right angles with the light traveling direction, but the faces at right angles with the light traveling direction may be inclined according to the deflected angle of G rays so that the rays have the same wavefront. By so doing, the diffraction efficiency can be improved, only to a little extent though.

Figure 12:
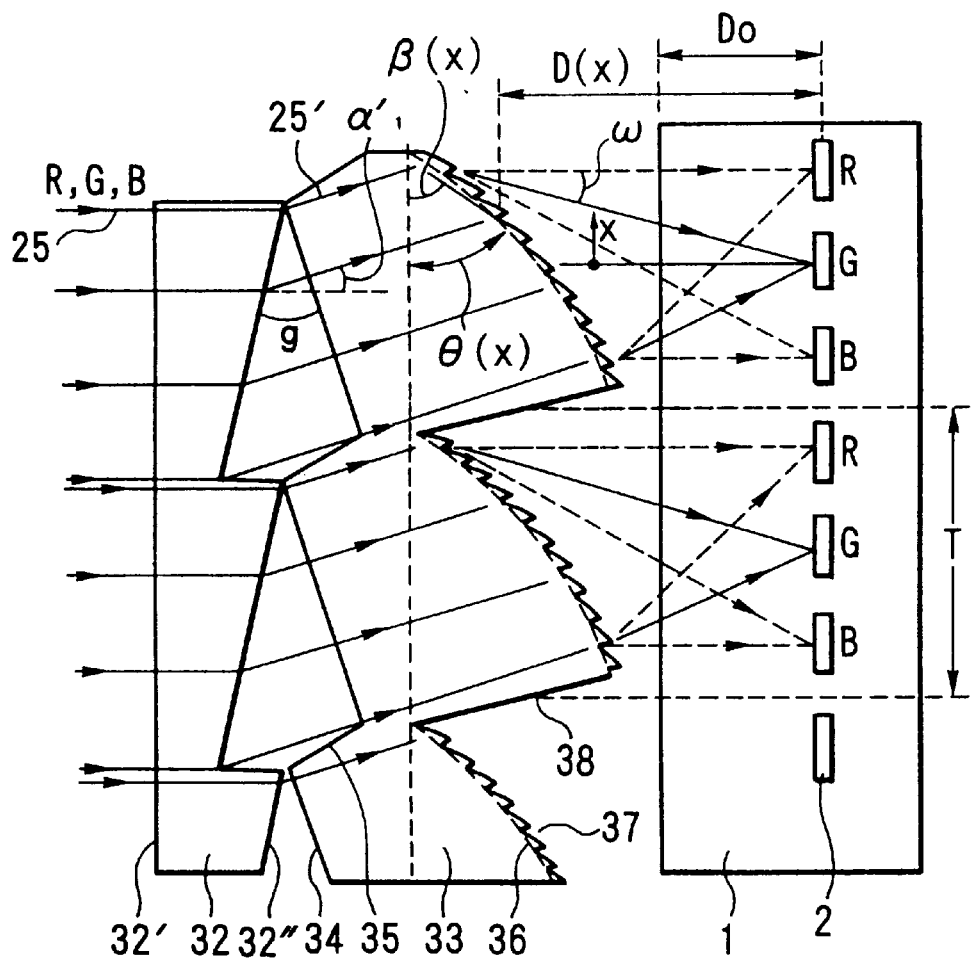
FIG. 12 is a schematic structure diagram showing a seventh embodiment (Type II) including macro prisms combined with macro prism type diffraction grating according to the present invention.

FIG. 12 shows a seventh embodiment, which belongs to Type II of the present invention in FIG. 1 already described.

In FIG. 12, the parts designated as 1, 2, and 25 are the same as have been described, 32 denotes linear Fresnel lens means, 32' denotes the light input face of this Fresnel lens means, 32" denotes a prism face formed on the light output face of the Fresnel lens means, 33 denotes light diffracting means having macro prisms combined with lenticular faces at its macroscopic level, and includes diffraction gratings at its microscopic level, 34 denotes a prism face formed on the light input face of the diffracting means, dotted lines 36 denote macro prisms combined with lenticular faces, 37 denotes diffraction gratings, and 38 denotes discontinuation faces of the macro prisms.

The input white light (25) is refracted at the prism faces 32", 34), and at a deflection angle of $\alpha_1'$ is incident on the diffraction gratings (37).

Figure 13:
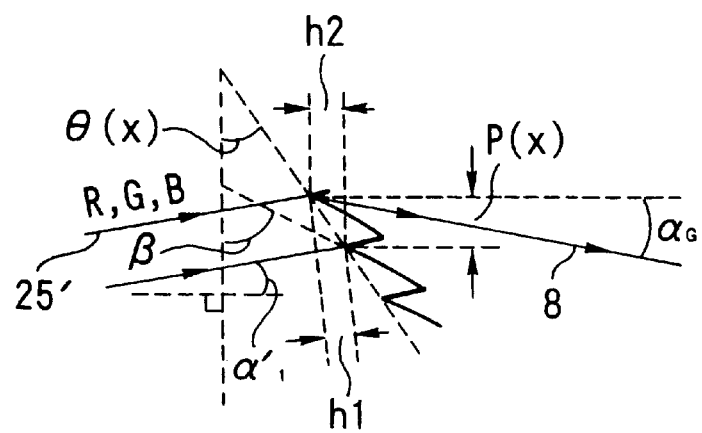
FIG. 13 is a fragmentary view, on an enlarged scale, of FIG. 12.

As illustrated, by defining x coordinates and also defining $\theta$, $\beta$, $h_1$, $h_2$, P and $\alpha_G$ as indicated in a fragmentary view, on an enlarged scale, in FIG. 13, the following equation holds.

$$P_{(x)} = \frac{L(\lambda_R - \lambda_G)}{\omega} \frac{80 \text{ nm} L}{\omega} \qquad L = 1, 2, 3 \qquad (25')$$

$$\omega = \frac{T}{3\left(\frac{D_0}{n} - D_0 + D_{(x)}\right)} \tag{26}$$

$$\alpha_G = \frac{x}{\frac{D_0}{n} - D_0 + D_{(x)}} \tag{27}$$

$$nh_1 - h_2 = L\lambda_G - P\alpha_G \tag{28}$$

$$nh_1 = np\tan(\theta - \alpha_1') \tag{29}$$

$$\psi np(\theta - \alpha_1')$$

$$h_2 = p\tan\theta \tag{30}$$

$$\therefore \alpha_G \approx n(\theta - \alpha_1') - \tan\theta - \frac{L\lambda_G}{P} \tag{31}$$

$$\alpha_G(x = 0) = 0$$

$$\therefore n\alpha_1' = n\theta_{(o)} - \tan\theta_{(o)} - \frac{\omega}{0.15} \tag{32}$$

$$\therefore n\theta_{(x)} - \tan\theta_{(x)} = n\alpha_1' - \frac{\omega}{0.15} + \frac{x}{\frac{D_0}{n} - D_0 + D_{(x)}} \tag{33}$$

$$g \approx \frac{n}{n-1}\alpha_1' \tag{34}$$

$$\tan\beta = \frac{n\sin\alpha_1' - \sin\alpha_G}{n\cos\alpha_1' + \cos\alpha_G} \tag{35}$$

In the above equation, equations (25') and (26) are the same as equations (25) and (26) mentioned above. Equation (27), which indicates the output direction of G ray, is the same as equation (24) mentioned above. The left side member $(nh_1-h_2)$ of equation (28) expresses the effective optical path difference at each step of the diffraction grating.

Therefore, according to equation (33), by periodically modulating the effective unit optical path difference as a function of x, the G output rays can be directed toward the G pixels. This modulation can be achieved by keeping compatibility with the constraint condition equation (25') showing the definition of the R-G separation angle. Therefore, Items 3.3 and 3.4 in FIG. 1 already described can be satisfied at the same time. Equation (34) shows the condition to be satisfied by the prism faces 32" and 34. Equation (35) is a condition for specifying the microscopic-level prism angle of the diffraction grating. To satisfy this condition is effective for increasing the diffraction efficiency close to 1.

With the above, description of FIGS. 12 and 13 is finished.

Figure 14:
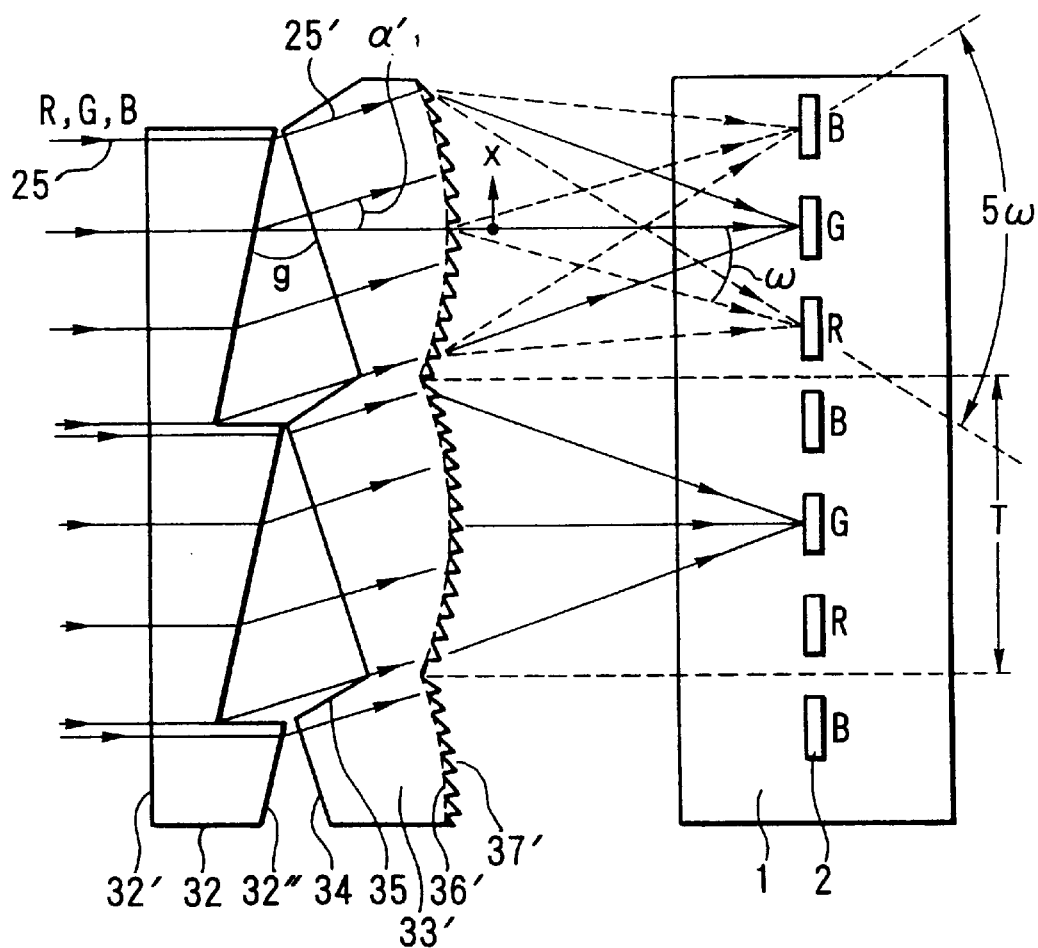
FIG. 14 is a schematic structure diagram showing an eighth embodiment (Type II) including macro lenticular light diffracting means according to the present invention.
Figure 15:
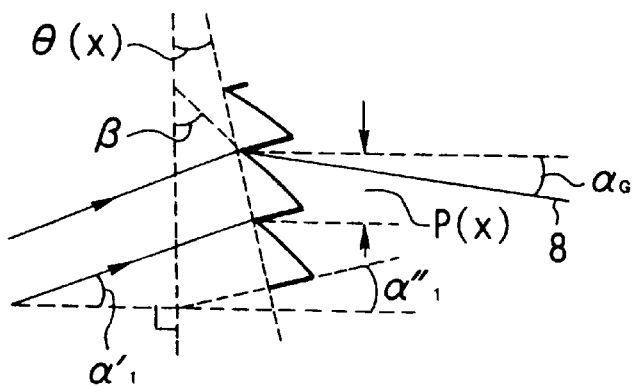
FIG. 15 is a fragmentary view, on an enlarged scale, of FIG. 14.

FIG. 14 shows an eighth embodiment of the present invention, which belongs to Type II in FIG. 1 already mentioned. In FIG. 14, the parts designated by 1, 2, 25, 32, 32', 32", 34, and 35 are the same as have been described above, 33' denotes light diffracting means has a lenticular structure at its macroscopic level, and includes diffraction gratings at its microscopic level, 36' denotes a dotted line indicating the macro lenticular shape, and 37' denotes diffraction gratings. FIG. 15 is a fragmentary view on an enlarged scale.

In FIG. 14, each lens formed by combining a prism face 34 and a macro lenticular shape 36' is a macro lenticular lens. A diffraction grating 27 may be joined with an adhesive to the outer surface of the macro lenticular shape 36'.

The equations expressing conditions in the eighth embodiment are as follows.

$$P_{(x)} = \frac{80 \text{ nm} L}{\omega} = \frac{3\left(\frac{D_0}{n} - D_0 + D_{(x)}\right)}{T} 80 \text{ nm} L \qquad L1, 2, 3 \tag{25}$$

$$\alpha_G = \frac{x}{\frac{D_0}{n} - D_0 + D_{(x)}} \tag{27}$$

-continued $$np\tan(\theta - \alpha'_1) - p\tan\theta = p\alpha_G - L\lambda_G \quad (36)$$
$$\approx (-n\tan\alpha'_1 + n\theta\sec^2\alpha'_1 - \theta)P$$

$$\therefore \theta_{(x)} = \frac{1}{n\sec^2\alpha'_1 - 1}\left\{\alpha_G + n\tan\alpha'_1 - \frac{L\lambda_G}{P}\right\} \quad (36')$$

$$\theta_{(o)} = \alpha_{G(o)} = 0 \quad (37)$$

$$\therefore n\tan\alpha'_1 = \frac{L\lambda_G}{P} = \frac{\omega}{0.15}$$

$$\therefore \theta_{(x)} = \frac{\alpha_G}{n\sec^1\alpha'_1 - 1} \quad (38)$$

$$\tan\beta_{(x)} = \frac{n\sin\alpha'_1 - \sin\alpha_G}{n\cos\alpha'_1 + \cos\alpha_G} \approx \frac{n\sin\alpha'_1}{n\cos\alpha'_1 - 1} \quad (35)$$

$$g \approx \frac{n}{n-1}\alpha'_1 \quad (34)$$

$$\alpha'_1 \geq \alpha''_1 > \omega \quad (39)$$

The main difference of the equations in the eighth embodiment from those in the preceding embodiment is that $L\lambda_G$ has a negative sign in equation (36) contrary to the positive sign that $L\lambda_G$ had in equation (28) in the seventh embodiment. The reason for this difference is because in FIG. 14 the zero order light output is oriented in the direction of the above right of the drawing. In this structure, equation (25) regarding the R-G separation angle ω and equation (38) regarding the deflected angle of advancing G ray, $\alpha_G$, can be made compatible independently, so that Items 3.4 and 3.5 in FIG. 1 can be made compatible. Expression (39) is a recommended condition to be satisfied by the deflected angle $\alpha_1$" of the discontinuation faces of the diffraction gratings to improve the diffraction efficiency. With this, description of the eighth embodiment is finished.

Figure 16:
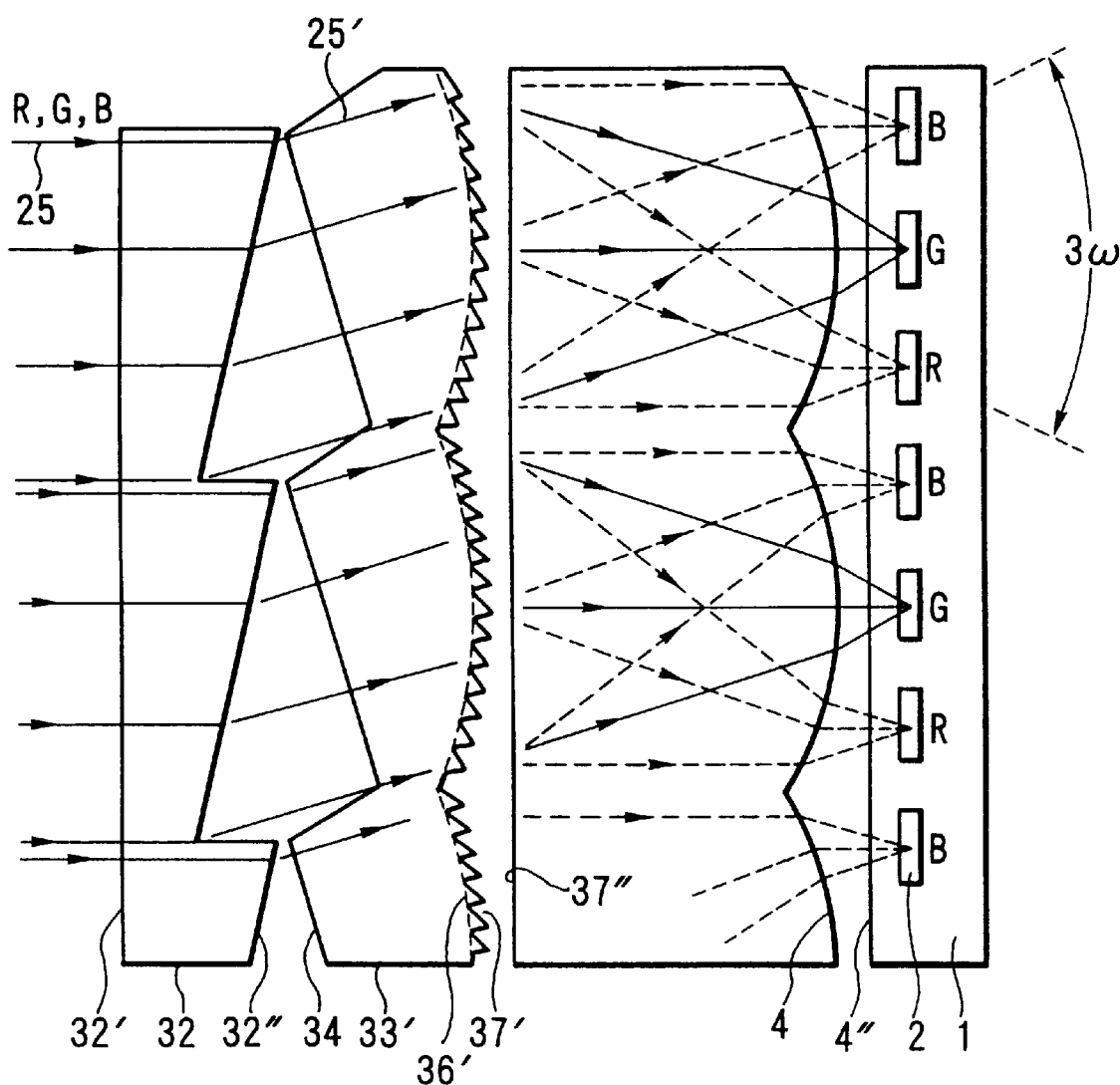
FIG. 16 is a schematic structure diagram showing a ninth embodiment (Type II) including macro lenticular light diffracting means according to the present invention.

FIG. 16 shows a ninth embodiment of the present invention. In FIG. 16, the parts designated by the reference numerals are the same as have been described above. In other words, this ninth embodiment is formed by adding field lens means 4 for reducing the light diverging angle to FIG. 14, to thereby decrease the diverging angle of rays output from the panel to 3ω. The focal plane of the field lens means is arranged to substantially coincide with the position of the diffraction gratings 37'.

A modification is possible, which is formed by adding the black stripe means 31 shown in FIG. 10 to this ninth embodiment, and this modification is included in the present invention. In FIG. 16, the collimator means 4 may be provided on the light input face 4" of the panel means. The diffraction gratings 37' may be provided on the face 37". With this, description of FIG. 16 is finished.

Figure 17:
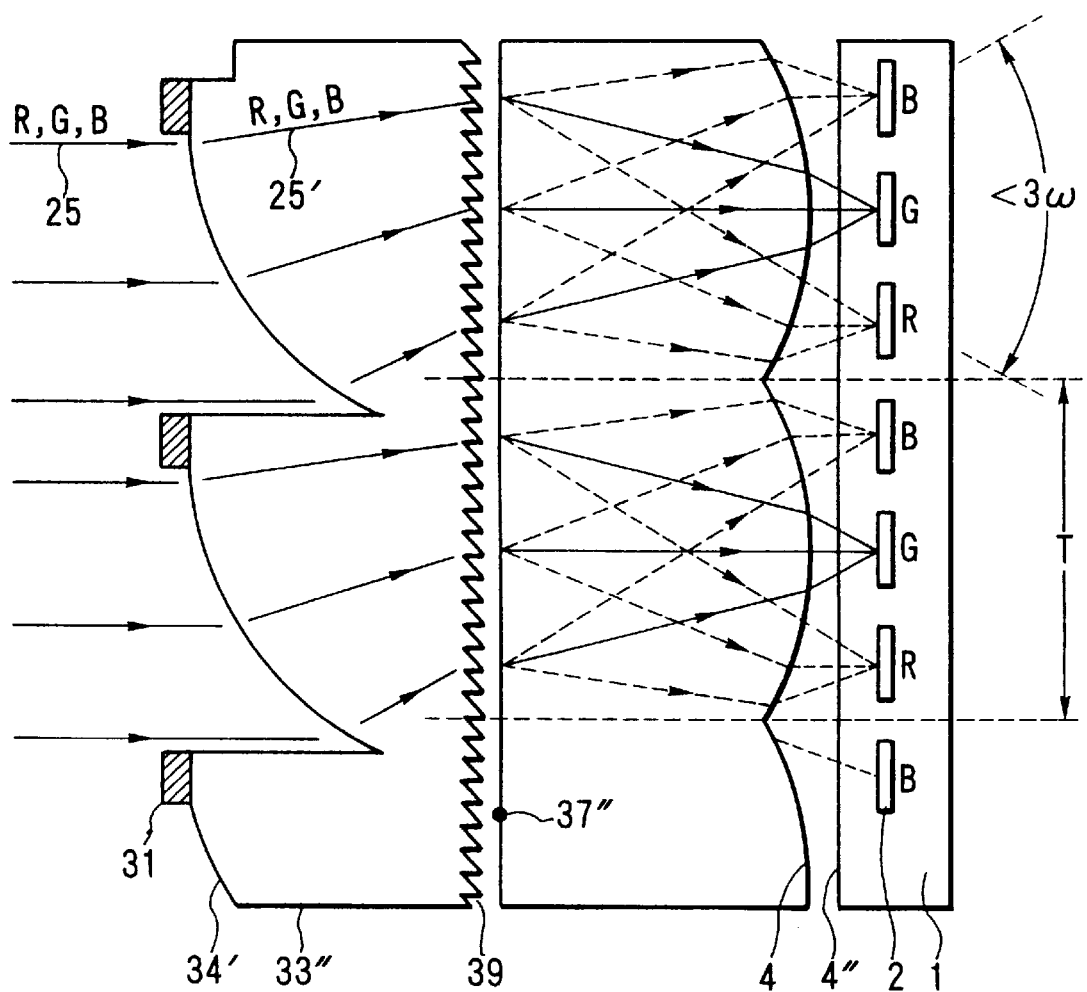
FIG. 17 is a schematic structure diagram showing a tenth embodiment (Type II) including macro lenticular light diffracting means according to the present invention.

FIG. 17 shows a tenth embodiment of the present invention. In FIG. 17, reference numeral 33" denotes light diffracting means having macro prisms combined with a lenticular face, 34' denotes a shape formed of macro prisms combined with a lenticular face formed on the light input face of the diffracting means, 31 denotes black stripe means, and 39 denotes diffraction grating. The operation principle of this tenth embodiment may be understood from the arrow-marked light rays and the descriptions of the drawings shown above. In FIG. 17, the focal plane of the collimator means for reducing the light diverging angle is arranged so as to substantially coincide with the position of the diffraction grating 39. The provision of the black stripe means 31 increases light loss, but there is an advantage that the diverging angle of output from the panel can be reduced to less than 3 ω.

Figure 18:
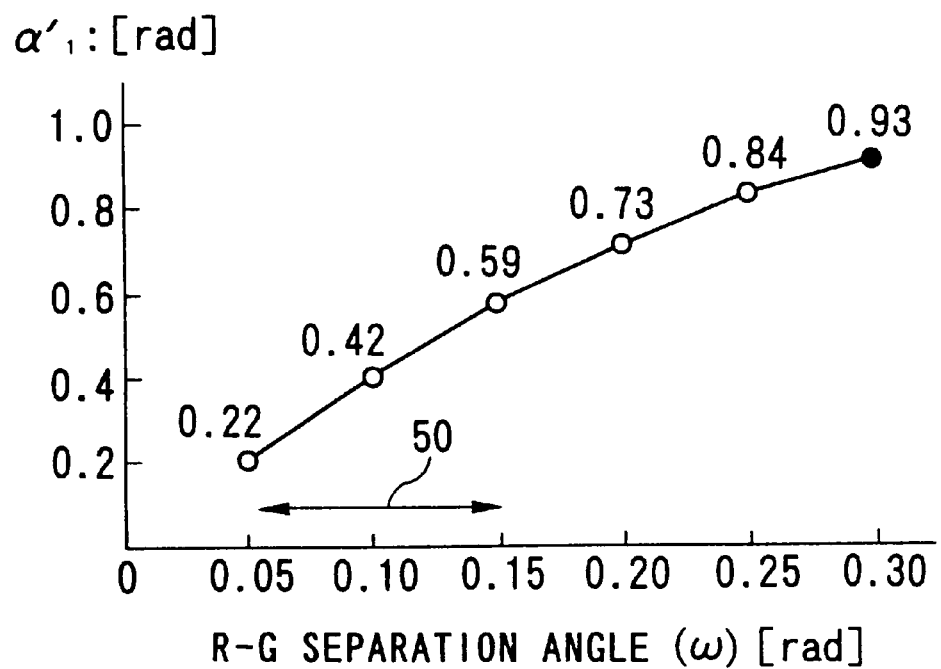
FIG. 18 is a graph showing the applicable range of the eighth and ninth embodiments according to the present invention.

FIG. 18 is a graph showing the applicable range of the eighth and ninth embodiments of the present invention shown in FIGS. 14 and 16.

FIG. 18 graphically depicts equation (37) and corresponds to a case where the material has a normal refractive index value of 1.5. To limit the deflected angle of the light going through the medium, $\alpha_1$' to about 0.6 or less rad is required to practically realize the prism components. Therefore, the applicable range of the eighth and ninth embodiments is the range indicated by 50 in FIG. 8. This range fully covers the range shown in inequality (10) mentioned above.

It ought to be noted that the first to sixth embodiments are used in applications which require greater R-G separation angles.

When the collimator means included in the block 23 has chromatic aberration, by correcting the value of R-G separation angle ω according to the amount of the chromatic aberration at issue, the chromatic aberration can be compensated.

In a direct viewing type liquid crystal display, a line light source is normally used for the light source means in the block 23. The collimator means is formed by combining a light guide plate, a row of prisms, black stripes, lenticular lenses, and so on. In such an application as this, the present invention can be applied if about 0.3 to 0.6 rad is selected for the value of the R-G separation angle ω. With this, description of the preferred embodiments of the present invention is finished.

In the embodiments from FIG. 8 onwards, which belong to Type II of the present invention, the array pitch of macro lenticular elements is substantially equal to the array pitch of the liquid crystal panel means. Therefore, the thermal expansion coefficients of the materials need to be matched to that of the liquid crystal panel means. The liquid crystal panel means is normally made of a glass material. Accordingly, in the embodiments of the present invention, too, a glass material is ordinarily used as the material of the macro lenticular type light diffracting means. The diffraction grating and the lenticular elements provided at the surface of the macro lenticular type light diffracting means are formed of a glass or resin material, but for general applications, a ultraviolet-light-hardening type resin material is recommended.

In the above presentation of the embodiments of the present invention, description has been made on the assumption that there is air in the spaces between the different components.

However, those spaces may be filled with a resin material having a smaller refractive index than that of the components of the embodiment. In this case, each embodiment can be formed by taking into consideration a fact that the effective optical path difference $nh_1-h_2$ changes to $nh_1-n_2h_2$.

Figure 19:
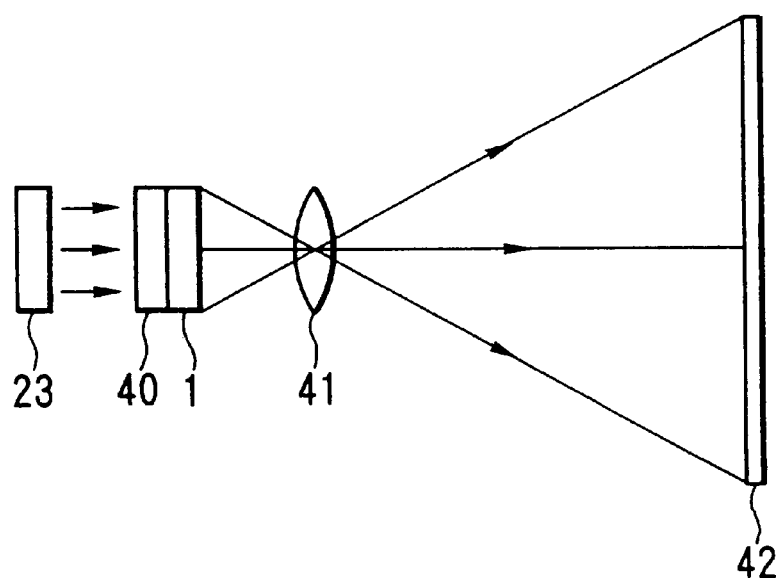
FIG. 19 is a schematic structure diagram showing an application of the present invention to a projection type display apparatus.

The liquid crystal display apparatus according to the present invention is not limited to the direct viewing type, but may be applied to the projection type and the optical fiber type. FIG. 19 shows an application of the present invention to the projection type display. In FIG. 19, reference numeral 40 denotes a block, typical of the embodiments described above, which includes the above-mentioned macro prism type or macro lenticular type light diffracting means in the present invention. Reference numeral 23 denotes a block including light source means and collimator means, 1 denotes liquid crystal panel means, 41 denotes projection lens means, and 42 denotes screen means.

Figure 20:
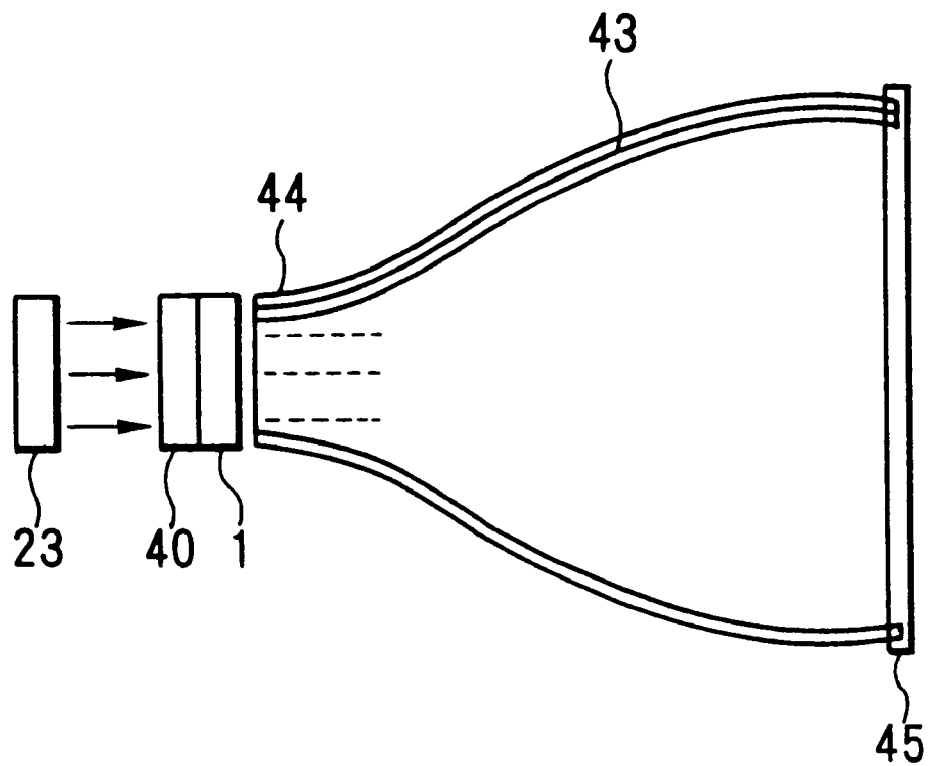
FIG. 20 is a schematic structure diagram showing an application of the present invention to an optical fiber display apparatus.

FIG. 20 shows an application of the present invention to the optical fiber type display. In FIG. 20, reference numeral

43 denotes optical fiber, 44 denotes a fiber light input end, and 45 denotes a fiber light output end plus fiber screen means.

When a liquid crystal panel utilizing the polarization of light is applied, in every embodiment, the use of P wave (equivalent to $E_z$ wave, or TM wave in the field of electric wave, is not essential but is recommended. The reason is that the interface reflection loss of P wave is, as is well known, smaller than that of S wave, which makes it possible to construct a high-efficiency optical system. With this, the introduction of the embodiments and applications of the present invention is finished.

According to those embodiments of the present invention, there is provided a single plate type color liquid crystal display apparatus with improved light transmission efficiency, which is capable of separating the input white light into three primary colors traveling in different directions, and guiding the three color rays to the corresponding pixels of the single plate liquid crystal panel means.

According to the first (FIG. 6) and the second (FIG. 7) embodiments of the present invention, it is possible to set the R-G separation angle by the light diffracting means at 0.05 rad or more and the deflected angle of the green ray at 0.17 rad or less, making it possible provide a compact optical system.

According to the third to tenth embodiments of the present invention, it is possible to achieve the compatibility of the converging actions by the light diffracting means into the R, G and B pixels, with the result that a liquid crystal display apparatus can be provided which has reduced color mixture, hence high picture quality, and less required power consumption.

To be more specific, as against the deterioration ratio of the light converging action of about 1.6 in the prior art, according to Type II in the present invention, that deterioration ratio can be reduced to about 1.4 or less, so that the utilization efficiency of R and B rays is thereby improved.

I claim:

1. A single plate type color liquid crystal display apparatus having light source means, collimator means, and single plate type liquid crystal panel means, comprising:

light diffracting means arranged between said collimator means and said single plate liquid crystal panel means; and three-position means, wherein said light diffracting means is, at a macroscopic level, in a three-dimensional unflat plate form with a macro periodic structural pitch and additionally has at least either a macro-prism shape or a stepped lenticular shape, and also includes a multi-stepped diffraction gratings at a microscopic level, wherein the input white light is, when it becomes a diffraction output, decomposed into three primary color rays traveling in three different directions, wherein a separation angle ω between a red ray and a green ray in said three primary color rays is larger than 0.05 rad, wherein about L (L is an integer out of 1, 2 and 3) times a specific optical wavelength $\lambda_0$ is selected for at least the principal ray an effective unit optical path difference at a unit step of said multi-stepped diffraction grating, wherein an array pitch projection P of said unit step in the direction at right angles with an advancing direction of said green output ray is arranged so as to be substantially equal to a value obtained by dividing about L times a red-green wavelength difference (about 80 nm) by said red-green separation angle ω, more specifically, 80L nm/ω, and wherein said three primary color rays as diffraction output, traveling in three different directions are converged to specified three color positions.

2. A single plate type color liquid crystal display apparatus according to claim 1, wherein a difference between said specific optical wavelength is smaller than 260 nm.

3. A single plate type color liquid crystal display apparatus according to claim 1, wherein said macro-prism shape is formed on the input side of said light diffracting means.

4. A single plate type color liquid crystal display apparatus according to claim 1, wherein said macro-prism shape is formed on the output side of said light diffracting means.

5. A single plate type color liquid crystal display apparatus according to claim 1, wherein said macro periodic structural pitch of said macro lenticular shape is arranged substantially equal to a three-color-pixel array period T of said liquid crystal panel means, and wherein said effective unit optical difference is modulated periodically so that each green output ray is directed to each green level, therefore said red-green separation angle ω and the advancing direction of said green output ray are selected independently of each other, with the result that said three-position means is replaced by a part of the functions of said light diffracting means.

6. A single plate type color liquid crystal display apparatus according to claim 5, wherein divergence-reducing field lens means is installed at the rear of said light diffracting means, wherein a focal plane of said divergence-reducing field lens means is made to substantially coincide with the position of said multi-stepped diffraction grating of said light diffracting means, and wherein said primary color rays traveling three different directions are directed to the three pixels at every three-pixel pitch.

7. A projection-version single plate type color liquid crystal display apparatus according to claim 1, further comprising projection lens and screen.

8. A single plate type color liquid crystal display apparatus according to claim 1, further comprising optical fiber and fiber screen, wherein said optical fiber is used to guide the output light of said single plate type liquid crystal panel to said fiber screen.

9. A single plate type color liquid crystal display apparatus having a light source, a collimator, and a single plate type liquid crystal panel, comprising:

a light diffracting part arranged between said collimator and said single plate liquid crystal panel; and a three-position member, wherein said light diffracting part is, at a macroscopic level, in a three-dimensional unflat plate form with a macro periodic structural pitch and additionally has at least either a macro-prism shape or a stepped lenticular shape, and also includes a multi-stepped diffraction gratings at a microscopic level, wherein the input white light is, when it becomes a diffraction output, decomposed into three primary color rays traveling in three different directions, wherein a separation angle ω between a red ray and a green ray in said three primary color rays is larger than 0.05 rad, wherein about L (L is an integer out of 1, 2 and 3) times a specific optical wavelength $\lambda_0$ is selected for at least the principal ray an effective unit optical path difference at a unit step of said multi-stepped diffraction grating, wherein an array pitch projection P of said unit step in the direction at right angles with an advancing direction of said green output ray is arranged so as to be substantially equal to a value obtained by dividing about L times a red-green wavelength difference (about 80 nm) by said red-green separation angle ω, more specifically, 80L nm/ω, and wherein said three primary color rays as diffraction output, traveling in three different directions are converged to specified three color positions.

10. A single plate type color liquid crystal display apparatus according to claim 9, wherein a difference between said specific optical wavelength is smaller than 260 nm.

11. A single plate type color liquid crystal display apparatus according to claim 9, wherein said macro-prism shape is formed on the input side of said light diffracting part.

12. A single plate type color liquid crystal display apparatus according to claim 9, wherein said macro-prism shape is formed on the output side of said light diffracting part.

13. A single plate type color liquid crystal display apparatus according to claim 9, wherein said macro periodic structural pitch of said macro lenticular shape is arranged substantially equal to a three-color-pixel array period T of said liquid crystal panel, and wherein said effective unit optical difference is modulated periodically so that each green output ray is directed to each green level, therefore said red-green separation angle ω and the advancing direction of said green output ray are selected independently of each other, with the result that said three-position member is replaced by a part of the functions of said light diffracting part.

14. A single plate type color liquid crystal display apparatus according to claim 13, wherein a divergence-reducing field lens is installed at the rear of said light diffracting part, wherein a focal plane of said divergence-reducing field lens is made to substantially coincide with the position of said multi-stepped diffraction grating of said light diffracting part, and wherein said primary color rays traveling three different directions are directed to the three pixels at every three-pixel pitch.

15. A single plate type color liquid crystal display apparatus according to claim 9, wherein said macro lenticular shape is provided as a shape formed of macro prisms combined with a macro lenticular face, further comprising at least one black stripe, and wherein a divergence-reducing collimator is installed at the rear of said diffraction grating, so that a focal plane of said divergence-reducing collimator is made substantially equal to the position of said diffraction grating.

16. A single plate type color liquid crystal display apparatus according to claim 9, further comprising at least one black stripe, wherein said at least one black stripe is arranged at least either on the input face of said diffracting part or on a face subsequent to said light diffracting part.

17. A projection-version single plate type color liquid crystal display apparatus according to claim 9, further comprising a projection lens and a screen.

18. A single plate type color liquid crystal display apparatus according to claim 9, further comprising an optical fiber and a fiber screen, wherein said optical fiber is used to guide the output light of said single plate type liquid crystal panel to said fiber screen.

* * * * *